United States Patent [19]
Merz

[11] 3,762,840
[45] Oct. 2, 1973

[54] ROTARY PISTON ENGINE OF TROCHOIDAL CONSTRUCTION

[75] Inventor: Josef Merz, Ruit, Germany

[73] Assignee: Daimler-Benz Aktiengesellschaft, Stuttgart-Unterturkheim, Germany

[22] Filed: May 7, 1971

[21] Appl. No.: 141,210

[30] Foreign Application Priority Data
May 8, 1970 Germany.................. P 20 22 615.7

[52] U.S. Cl.................... 418/5, 418/15, 418/60, 418/61
[51] Int. Cl...... F01c 1/02, F01c 11/00, F04c 23/00
[58] Field of Search .................... 418/5, 15, 60, 61; 60/39.61, 39.62

[56] References Cited
UNITED STATES PATENTS

| | | |
|---|---|---|
| 3,452,643 | 7/1969 | Pratt .................................. 418/61 |
| 3,628,899 | 12/1971 | George ................................. 418/61 |
| 717,869 | 1/1903 | Knight .................................. 418/5 |
| 1,227,173 | 5/1917 | Moors.................................. 418/60 |
| 3,347,213 | 10/1967 | Froede.............................. 123/8.45 |
| 3,535,059 | 10/1970 | Kalkbrenner ........................ 418/60 |

Primary Examiner—Al Lawrence Smith
Assistant Examiner—John J. Vrablik
Attorney—Craig, Antonelli & Hill

[57] ABSTRACT

A rotary piston steam engine of trochoidal construction which includes at least one piston with $n + 1$ corners sliding with its piston corners along the trochoidal surface of the housing casing having $n$ arcs, in which one inlet and one outlet channel for the supply and discharge of steam is provided in proximity of each transition between the arcs of the trochoidal surface.

15 Claims, 5 Drawing Figures

INVENTOR
JOSEF MERZ

BY Craig, Antonelli & Hill

ATTORNEYS

ROTARY PISTON ENGINE OF TROCHOIDAL CONSTRUCTION

The present invention relates to a rotary piston engine of trochoidal construction having at least one piston with $n + 1$ corners, which rotates on an eccentric of an eccentric shaft and with its corners slides along a trochoidal surface having $n$ arcs that represent the inner boundary of a housing casing, in which at least one inlet channel and one outlet channel are provided.

It is known to use such types of rotary piston engines as internal combustion engines. The present invention is conecerned with the task to so equip and construct rotary piston engines of the aforementioned type that they can be used as steam engines.

The underlying problems are solved according to the present invention in that the rotary piston engine is constructed as steam engine with n-fold admission, whereby one inlet channel and one outlet channel each are provided in proximity to each transition between the arcs.

By the use of a rotary piston engine as steam engine, further advantages are achieved in addition to the known advantages of the rotary piston engine, especially the absence of reciprocating masses, and of the steam engine, especially of the small quantity in harmful exhaust gases. Thus, the rotary piston engine, by reason of its $n$-fold admission or charging, achieves a very high specific output. For example, with a triangular piston ($n=2$), six expansion cycles are carried out per rotation of the piston. Furthermore, the rotary piston engine, in contrast to the use thereof as internal combustion engine, is thermally loaded uniformly, when used as steam engine, since the spaces between all arcs and the piston serve as expansion spaces.

In an advantageous construction of the present invention, rotary slide valve members of any conventional construction are arranged in the housing casing which open and close the inlet channel with respect to the steam supply lines and the outlet channels with respect to the steam discharge or outlet lines. The steam supply and discharge can be controlled thereby in a simple manner whereby it is possible to determine by a corresponding design of the rotary slide valves, the duration of the in-flow and the beginning of the expansion.

Furthermore, the inlet channel and the outlet channel, which are arranged in proximity to a transition between two arcs, may be controlled in common by a rotary slide valve. The number of the rotary slide valves is reduced thereby so that the rotary piston engine can be manufactured in a more simple and more inexpensive manner.

The rotary slide valve may be constructed as a roller rotating in a cylinder with the same rotational speed as the piston, and $n + 1$ segment-like recesses may be provided in the roller. A particularly simple type of construction of the rotary slide valve is achieved thereby, whereby the beginning and duration of in-flow and expansion can be determined by the width of the recesses as well as the location of the discharge orifices of inlet channel, outlet channel, steam supply line and steam discharge line in the cylinder.

For the purpose of achieving a multi-stage expansion of the steam with a rotary piston engine of multi-disk type of construction, the disks may be connected at least partially in series in the direction of flow of the steam whereby the series-connected disks increases in width and/or number corresponding to the increase of the specific steam volume.

Accordingly, it is an object of the present invention to provide a rotary piston engine of trochoidal construction which can be used in a simple manner as steam engine.

Another object of the present invention resides in a rotary piston engine of trochoidal construction which not only benefits from the inherent advantages of a rotary piston engine but also assures a very high specific power output.

A further object of the present invention resides in a steam engine which is characterized by the absence of reciprocating masses, yet assures uniform thermal loading of all the engine parts.

Still another object of the present invention resides in a rotary piston engine constructed as stema engine which is simple'in construction as well as in its control equipment.

A still further object of the present invention resides in a rotary piston engine constructed as steam engine which permits a simple control of the supply and discharge of the steam as well as of the beginning and duration of the expansion cycles.

These and further objects, features and advantages of the present invention will become more obvious from the following description when taken in connection with the accompanying drawing which shows, for purposes of illustration only, one embodiment in accordance with the present invention, and wherein.

Figure 1:
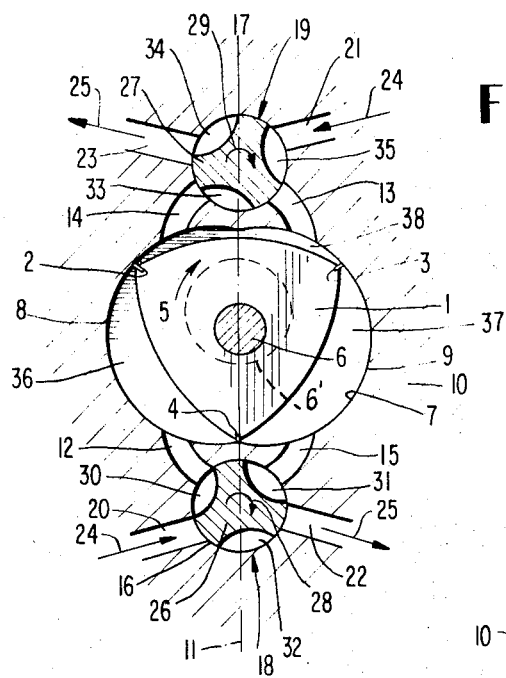
FIGS. 1 to 3 are schematic partial cross-sectional views through a rotary piston engine of trochoidal construction with a triangular piston, which illustrate three different phases of the working cycle of the rotary piston engine.

Referring now to the drawing wherein the reference numerals are used throughout the three views to designate like parts, a triangular piston 1 ($n=2$) with three corners 2, 3, 4 rotates in the direction of arrow 5 on an eccentric 6' (schematically shown in dash lines in FIG. 1 only) of an eccentric shaft 6 and slides thereby with its corners 2, 3, 4 along a trochoidal surface 7 having two arcs 8, 9. The trochoidal surface 7 is provided within a housing casing 10. In proximity of the two transitions of the arcs 7 and 8, i.e., in the illustrated embodiment in proximity to the minor axis 11, one inlet channel 12, 13 each and one outlet channel 14, 15 each extend from the trochoidal surface 7 to the cylinders 16 and 17 of two rotary slide valves generally designated by reference numerals 18, 19 which are arranged within the housing casing 10. Furthermore, steam supply lines 20, 21 and steam discharge lines 22, 23 extend to the cylinders 16, 17, whereby the direction of flow of the steam is indicated by the arrows 24, 25. One roller 26, 27 each rotates in the cylinders 16, 17 with the same rotational speed and in the same direction of rotation (arrows 28, 29) as the piston 1. Three segment-like recesses 30 to 35 are provided in each roller 26, 27. The inlet channels 12, 13 are thereby connected with the steam supply lines 20, 21 and the outlet channels 14, 15 with the steam discharge lines 22, 23 three times during each rotation of the rollers 26, 27. An overflowing of steam from the feed lines 20, 21 or from the inlet channels 12, 13 to the steam discharge lines 22, 23 or the outlet channels 14, 15 is not possible.

In FIG. 1, the roller 26 begins to close the steam feed line 20, the steam in-flow into a working space 36 between the arc 8 of the trochoidal surface 7 and the piston 1 is terminated and the expansion begins within this working space. Simultaneously therewith, the roller 26 opens the steam discharge line 22 so that steam expanded in a second working space 37 can flow off by way of the outlet channel 15 and the recess 31. The roller 27 has closed the steam discharge line 23 whereas it opens the inlet channel 13 so that steam begins to flow into a third working space 38 which has its smallest volume.

Figure 2:
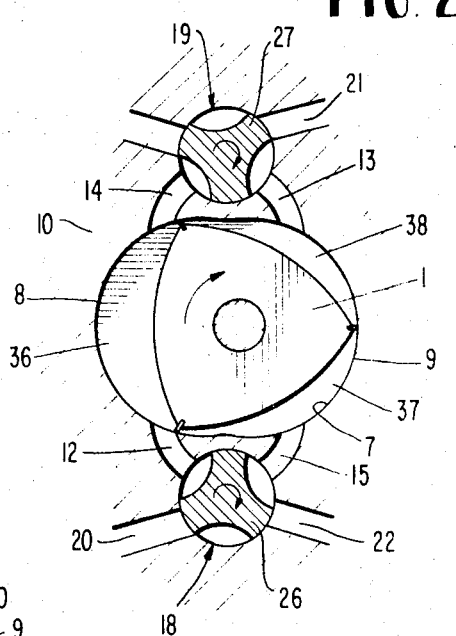

In FIG. 2, the working space 36 after a rotation of the piston through 30° has reached its largest volume, the steam feed line 20 is closed, the steam discharge line 23 begins to open, and the steam begins to flow out of the working space 36. With the closing of the steam supply line 21, the expansion commences in the working space 38. After opening of the of the steam discharge line 22, the steam is discharged out of the working space 37.

Figure 3:
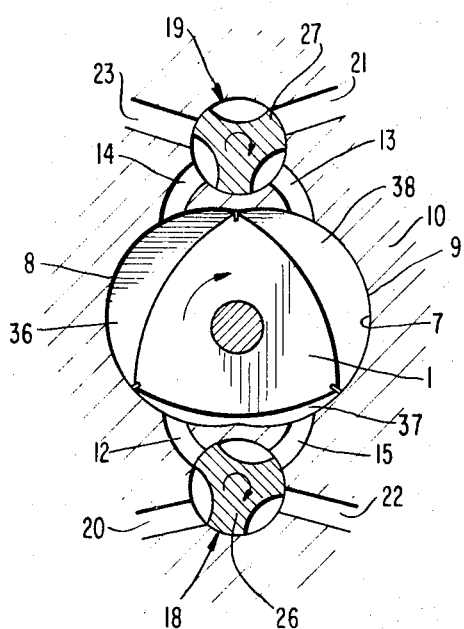

In FIG. 3, the piston 1 has rotated through a further 30°. In the working space 36, after complete opening of the steam discharge line 23, the discharge of the steam is continued. The expansion takes place in the working space 38 after closing of the steam feed line 21. The discharge of the steam out of the working space 37 is terminated by the roller 26 with the interruption of the connection between the same and the steam discharge line 22; however, simultaneously therewith, the filling of the working space 37 commences with the opening of the inlet channel 12.

It is, of course, also possible to operate the described rotary piston engine without any change with saturated steam, super-heated steam or compressed gases.

Figure 4:
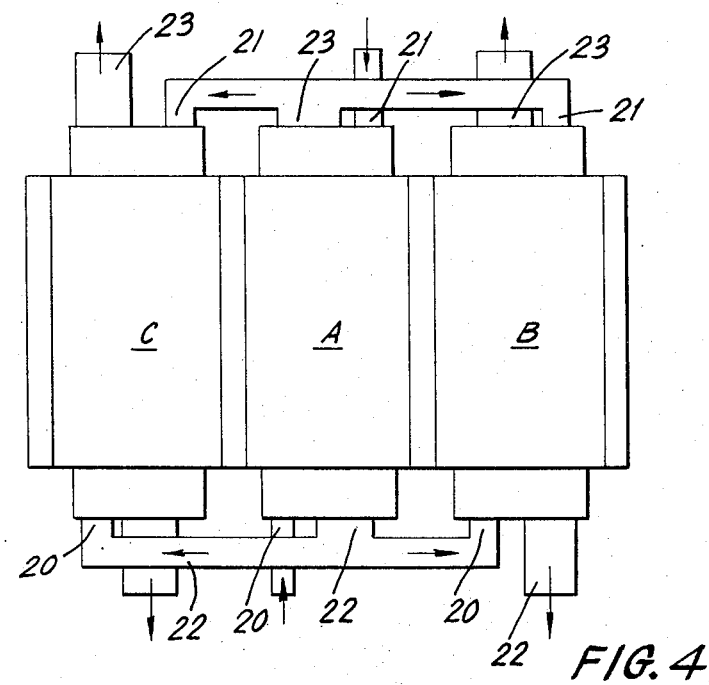
FIG. 4 is a schematic illustration of a first embdiment of a multi-disk rotary piston engine in accordance with the present invention.
Figure 5:
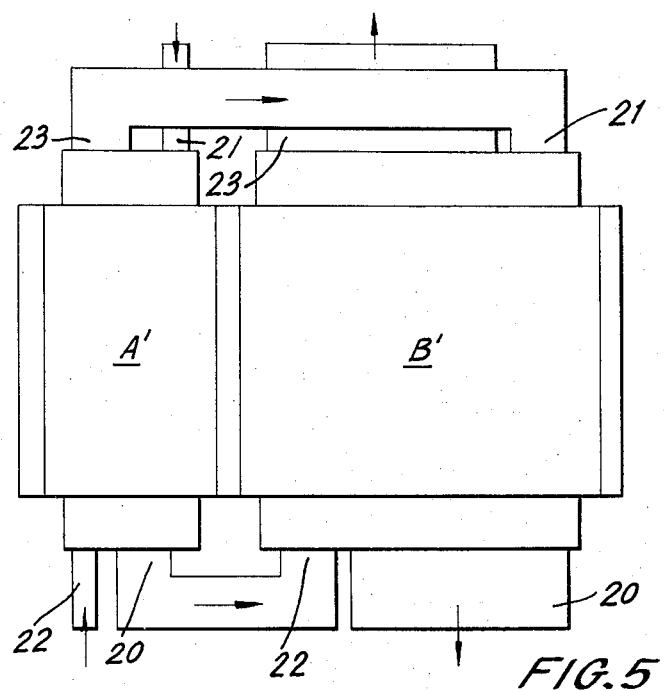
FIG. 5 is a schematic illustration of a second embodiment of a multi-disk rotary piston engine in accordance with the present invention.

FIGS. 4 and 5 schematically illustrate multi-disk embodiments of the present invention with reference numerals corresponding to the reference numeals used in FIGS. 1 to 3 designating respective inlets and outlets of each of the disks and with arrows indicating the direction of steam flow through the engine. In the FIG. 4 arrangement, the central disk A' is under the effect of fresh steam and is serially connected to each of the respective adjacent disk B' and C'. In the FIG. 5 arrangement, disk A' is under the effect of fresh steam and is serially connected to adjacent broader disk B' for further expansion of the steam.

While I have shown and described only one embodiment in accordance with the present invention, it is understood that the same is not limited thereto but is susceptible of numerous changes and modifications as known to those skilled in the art, and I therefore do not wish to be limited to the details shown and described herein, but intend to cover all such changes and modifications as are encompassed by the scope of the appended claims.

I claim

1. A rotary piston engine of trochoidal construction which includes a piston means having n + 1 piston corners which rotates on an eccentric of an eccentric shaft and with its piston corners slides along a trochoidal surface means with n arcs, which represents the inner boundary of a housing casing means provided with inlet and outlet channel means, characterized in that the rotary piston engine is constructed as steam engine having an n-fold admission, one inlet channel means and one outlet channel means each being provided in proximity to each transition between the arcs of the trochoidal surface means, rotary slide valve means arranged in the housing casing means and operable to open and close the inlet channel means with respect to steam supply line means and the outlet channel means with respect to steam discharge line means, the inlet channel means and the outlet channel means which are arranged in the casing means in proximity to a transition between two arcs being controlled jointly by a respective common rotary slide valve means.

2. A rotary piston engine according to claim characterized in that the rotary slide valve means is constructed as a roller means rotating in a cylinder with the same rotational speed as the piston means, and in that n + 1 segment-like recesses are provided in a respective roller means to provide a communication between respective steam supply line means and inlet channel means and between respective steam discharge line means and outlet channel means.

3. A rotary piston engine of multi-disk construction according to claim 2, characterized in that the disks are connected at least partially in series in the direction of flow of the steam.

4. A rotary piston engine according to claim 3, characterized in that the series-connected disks increase in width c orresponding to the increase of the specific steam volume.

5. A rotary piston engine according to claim 4, characterized in that the series-connected disks increase in width corresponding to the increase of the specific steam volume.

6. A rotary piston engine of trochoidal construction which includes a piston means having n + 1 piston corners which rotates on an eccentric of an eccentric shaft and with its piston corners slides along a trochoidal surface means with n arcs, which represents the inner boundary of a housing casing means provided with inlet and outlet channel means, characterized in that the rotary piston engine is constructed as steam engine having an n-fold admission, one inlet channel means and one outlet channel means each being provided in proximity to each transition between the arcs of the trochoidal surface means, and rotary slide valve means rotating in a cylinder with the same rotational speed as the piston means, n + 1 segment-like recesses being provided in a respective slide valve means to provide a communication in predetermined timed sequence between a supply line means and the inlet channel means and between the outlet channel means and a discharge line means.

7. A rotary piston engine according to claim 6, characterized in that each slide valve means is a roller-type valve which valves one inlet channel means, one outlet channel means, one steam discharge line means and one steam supply line means arranged circumferentially in said order about the slide valve means.

8. A rotary piston engine according to claim 6, characterized in that each slide valve means has a substantially cylindrical surface and is provided with n + 1 segment-like recesses circumferentially spaced along the cylindrical surface thereof, said recesses extending over an arc of the cylindrical surface about equal to the arcuate spacing between the ends of a respective steam supply line means and inlet channel means and between the ends of a respective outlet channel means and discharge line means.

9. A rotary piston engine according to claim 6, characterized in that each slide valve means rotates continuously in a given direction of rotation during rotation of the piston means.

10. A rotary piston engine according to claim 9, characterized in that each slide valve means is a roller-type valve which valves one inlet channel means, one outlet channel means, one steam discharge line means and one steam supply line means arranged circumferentially in said order about the slide valve means.

11. A rotary piston engine according to claim 10, characterized in that each slide valve means has a substantially cylindrical surface and is provided with n + 1 segment-like recesses circumferentially spaced along the cylindrical surface thereof, said recesses extending over an arc of the cylindrical surface about equal to the arcuate spacing between the ends of a respective steam supply line means and inlet channel means and between the ends of a respective outlet channel means and discharge line means.

12. A rotary piston engine of multi-disk construction according to claim 6, characterized in that the disks are connected at least partially in series in the direction of flow of the steam.

13. A rotary piston engine according to claim 12, characterized in that the series-connected disks increase in number corresponding to the increase of the specific steam volume.

14. A rotary piston engine according to claim 12, characterized in that the series-connected disks increase in width corresponding to the increase of the specific steam volume.

15. A rotary piston engine according to claim 14, characterized in that the series-connected disks increase in number corresponding to the increase of the specific steam volume.

* * * * *